(12) United States Patent
Fukuda

(10) Patent No.: US 8,773,549 B2
(45) Date of Patent: Jul. 8, 2014

(54) IMAGE PROCESSING APPARATUS, IMAGE PROCESSING METHOD, IMAGE PICKUP APPARATUS, AND DISPLAY DEVICE

(71) Applicant: Canon Kabushiki Kaisha, Tokyo (JP)

(72) Inventor: Koichi Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 13/688,549

(22) Filed: Nov. 29, 2012

(65) Prior Publication Data

US 2013/0155269 A1 Jun. 20, 2013

(30) Foreign Application Priority Data

Dec. 16, 2011 (JP) ................................ 2011-275953

(51) Int. Cl.
*H04N 5/228* (2006.01)
*H04N 13/00* (2006.01)
*H04N 5/225* (2006.01)
*H04N 5/262* (2006.01)
*H04N 5/232* (2006.01)
*G06K 9/32* (2006.01)

(52) U.S. Cl.
USPC ....... 348/222.1; 348/42; 348/218.1; 348/239; 348/349; 382/300

(58) Field of Classification Search
CPC ............ H04N 13/021; H04N 13/0203; H04N 5/23212; H04N 5/23238; H04N 9/045; H04N 1/3876
USPC ............... 348/42, 49, 218.1, 349, 222.1, 280, 348/239; 382/300
See application file for complete search history.

(56) References Cited

U.S. PATENT DOCUMENTS

| | | | |
|---|---|---|---|
| 4,410,804 A | 10/1983 | Stauffer | |
| 6,750,437 B2 * | 6/2004 | Yamashita et al. | 348/294 |
| 7,233,359 B2 * | 6/2007 | Suda | 348/349 |
| 7,924,327 B2 * | 4/2011 | Nagashima et al. | 348/239 |
| 7,932,941 B2 * | 4/2011 | Hayasaka et al. | 348/272 |
| 8,159,599 B2 * | 4/2012 | Takamiya | 348/345 |
| 2011/0141309 A1 * | 6/2011 | Nagashima et al. | 348/222.1 |
| 2012/0140100 A1 * | 6/2012 | Shibazaki et al. | 348/281 |
| 2012/0242855 A1 * | 9/2012 | Nagasaka et al. | 348/222.1 |
| 2012/0281067 A1 * | 11/2012 | Ooi et al. | 348/51 |
| 2012/0300104 A1 * | 11/2012 | Onuki et al. | 348/302 |

FOREIGN PATENT DOCUMENTS

JP 2001-083407 A 3/2001

OTHER PUBLICATIONS

R. Ng et al., "Light Field Photography with a Hand-held Plenoptic Camera", Stanford Tech Report, CTSR Feb. 2005, pp. 1-11.

* cited by examiner

*Primary Examiner* — Nhan T Tran
(74) *Attorney, Agent, or Firm* — Fitzpatrick, Cella, Harper & Scinto

(57) ABSTRACT

An image processing apparatus generates a plurality of parallactic images having a relationship that the magnitude of an amount of image shift between parallactic images increases with an increase of a defocus amount, generates, through plural selections of the generated parallactic images permitting a repeated same selection, a series of parallactic images in which the selected parallactic images are arranged in a selection order; repeatedly applies interpolation processing to each pair of adjacent parallactic images included in the series of parallactic images to generate a plurality of interpolation images; and arranges the interpolation images between the adjacent parallactic images to output the interpolated parallactic images as an output image of a moving image.

11 Claims, 9 Drawing Sheets

IMAGE PROCESSING APPARATUS, IMAGE PROCESSING METHOD, IMAGE PICKUP APPARATUS, AND DISPLAY DEVICE

BACKGROUND OF THE INVENTION

1. Field of the Invention

The present invention relates to an image processing apparatus, an image processing method, an image pickup apparatus, and a display device, and more particularly to an image processing apparatus, which is configured to generate and display a stereoscopic image that can be displayed by a conventional display device, an image processing method, an image pickup apparatus, and a display device.

2. Description of the Related Art

There has been proposed an image pickup apparatus which can divide an exit pupil of a photographing lens into a plurality of pupil areas and can simultaneously take a photograph of a plurality of parallactic images corresponding to the divided pupil areas.

U.S. Pat. No. 4,410,804 discloses an image pickup apparatus using a two-dimensional image pickup element in which one microlens and divided photoelectric conversion units are formed for one pixel. The divided photoelectric conversion units are configured to receive different partial pupil areas of an exit pupil of a photographing lens through the microlens, thereby attaining pupil division. A plurality of parallactic images corresponding to divided partial pupil areas can be generated from photoelectric conversion signals from the divided photoelectric conversion units. Japanese Patent Application Laid-Open No. 2001-083407 discloses that a picked-up image is generated by adding all signals received by the divided photoelectric conversion units.

A plurality of taken parallactic images is equivalent to Light Field (LF) data which is information of a spatial distribution of light intensity and angular distribution. "Light Field Photography with a Hand-held Plenoptic Camera" by Ren Ng et al., Stanford Tech Report CTSR 2005-02, 1 (2005) discloses a refocus technology of changing an in-focus position of a picked-up image after photographing by synthesizing an image on a virtual focusing plane different from an image pickup plane using obtained LF data.

However, an exclusive three-dimensional display device and wear of exclusive glasses are required in order to perform a three-dimensional display by using a plurality of parallactic images, and there is a problem that convenience of the three-dimensional display is reduced.

SUMMARY OF THE INVENTION

The present invention has been made in view of the above-described problem. It is an aspect of the invention to three-dimensionally display a plurality of parallactic images without reducing the convenience, using a standard display device and without using an exclusive three-dimensional display device.

In order to solve the above-described problem of the related art, according to an aspect of the invention, an image processing apparatus generates a plurality of parallactic images having a relationship in which the magnitude of an amount of image shift between parallactic images increases with an increase in the magnitude of a defocus amount, generates, through n times selections (n is a positive integer) of the generated parallactic images permitting a repeated same selection, a series of parallactic images in which the selected parallactic images are arranged in a selection order, repeatedly applies interpolation processing to each pair of adjacent parallactic images included in the series of parallactic images to generate a plurality of interpolation images, and arranges the generated interpolation images between the adjacent parallactic images to output the interpolated parallactic images as an output image of a moving image.

Further features of the present invention will become apparent from the following description of exemplary embodiments with reference to the attached drawings.

DESCRIPTION OF THE EMBODIMENTS

Hereinafter, exemplary embodiments of the present invention will be described in detail in accordance with the accompanying drawings.

First Embodiment

Figure 1:
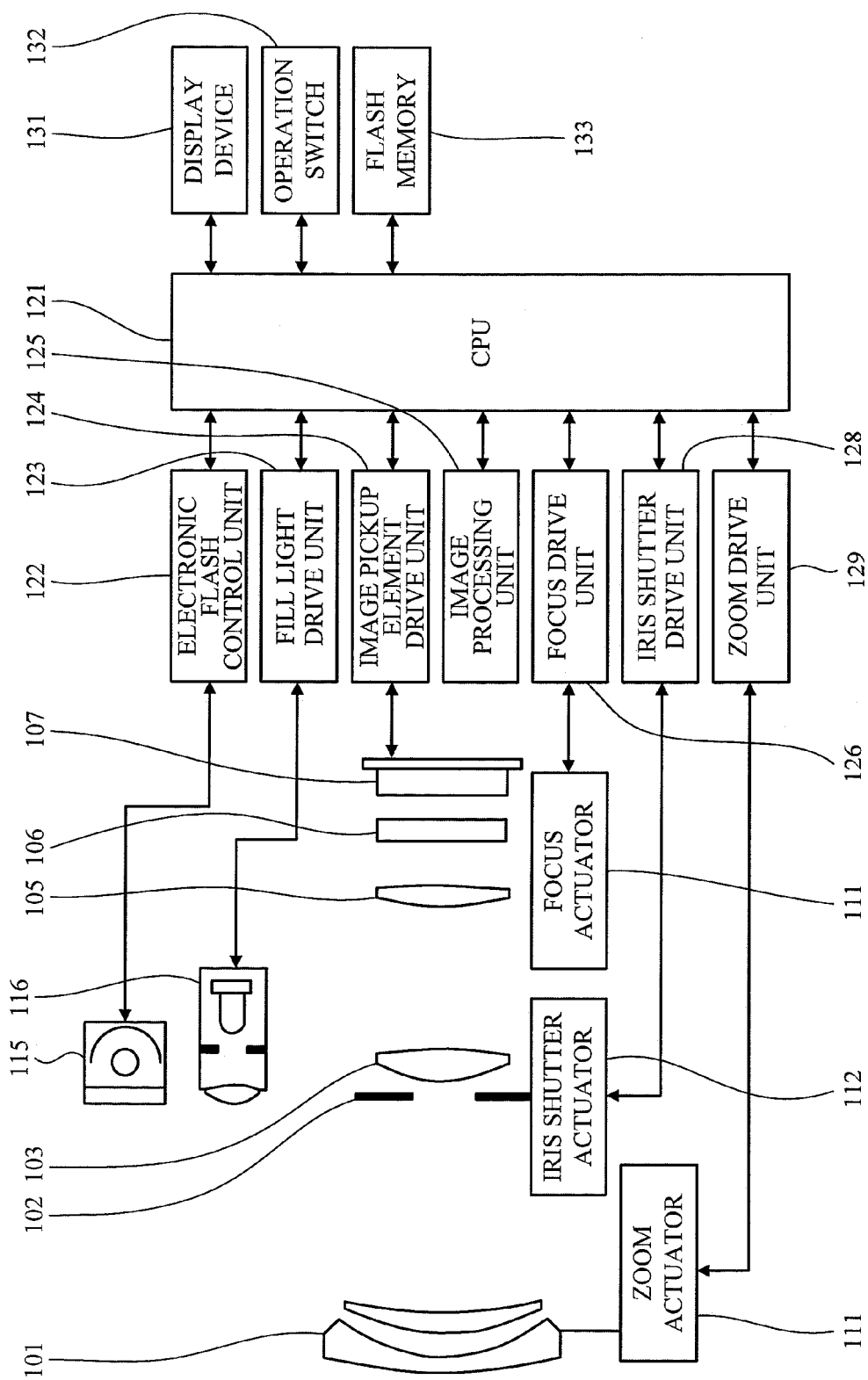
FIG. 1 is a schematic configuration diagram of an image pickup apparatus according to an embodiment of the present invention.

FIG. 1 is a view showing a schematic configuration of a camera as an image pickup apparatus having an image pickup element according to the present invention.

In FIG. 1, reference numeral 101 denotes a first lens group disposed at the tip of a focusing optical system, and the first lens group 101 is held to be movable backward and forward in an optical axis direction. Reference numeral 102 denotes an iris shutter, and the iris shutter 102 adjusts a light amount upon photographing by adjusting an aperture diameter and moreover has a function as a shutter for adjusting an exposure time upon photographing a still image. Reference numeral 103 denotes a second lens group. The iris shutter 102 and the second lens group 103 integrally move backward and forward in the optical axis direction and effects a magnification function (zoom function) by cooperation of the forward and backward movement of the first lens group 101.

Reference numeral 105 denotes a third lens group, and the third lens group 105 performs focusing with the forward and backward movement in the optical axis direction. Reference numeral 106 denotes an optical low-pass filter, and the optical low-pass filter 106 is an optical element used for reducing false color and moire in a taken image. Reference numeral 107 denotes an image pickup element including a two-dimensional CMOS photo sensor and a peripheral circuit portion, and the image pickup element 107 is disposed on a focusing plane of a focusing optical system.

Reference numeral 111 denotes a zoom actuator, and the zoom actuator 111 rotates a cam barrel (not shown) to move the lens groups of the first to third lens group 111 to 103 forward and backward in the optical axis direction and performs a magnification operation. Reference numeral 112 denotes an aperture-shutter actuator, and the aperture-shutter actuator 112 controls the aperture diameter of the iris shutter 102 to adjust a photographing light amount and, at the same time, controls an exposure time upon photographing a still image. Reference numeral 114 denotes a focus actuator, and the focus actuator 114 moves the third lens group 105 forward and backward in the optical axis direction to perform focusing. Those components provide the focusing optical system.

Reference numeral 115 denotes an electronic flash for illuminating an object. Although a flash illumination device using a xenon tube is preferably used, an illumination device provided with a continuous light-emitting LED may be used. Reference numeral 116 denotes an AF fill light unit, and the AF fill light unit 116 projects an image of a mask having a predetermined aperture pattern on a field through a projection lens and enhances focus detection performance with respect to a dark object or a low-contrast object.

Reference numeral 121 denotes a CPU included in a camera responsible for various controls of a camera body, and the CPU 121 has a calculation portion, a ROM, a RAM, an A/D converter, a D/A converter, a communication interface, and the like. The CPU 121 drives various portion of a camera, and executes and controls a series of operation such as AF, photographing, image generation, and recording based on predetermined programs stored in the ROM. The CPU 121 provides various functions as an image processing unit which generates a parallactic image according to the present invention.

Reference numeral 122 denotes an electronic flash control unit that controls an illumination unit 115 to turn on in synchronism with photographing operation. Reference numeral 123 denotes a fill light drive unit that controls an AF fill light unit 116 to turn on in synchronism with focus detection operation. Reference numeral 124 denotes an image pickup element drive unit that controls image pickup operation of the image pickup element 107 and, at the same time, A/D converts an obtained image signal to send the image signal to the CPU 121. Reference numeral 125 denotes an image processing unit, and the image processing unit 125 performs processing such as γ conversion, color interpolation, and JPEG compression of an image obtained by the image pickup element 107.

Reference numeral 126 denotes a focus drive unit, and the focus drive unit 126 drives and controls the focus actuator 114 based on focus detection results and moves the third lens group 105 forward and backward in the optical axis direction to perform focusing. Reference numeral 128 denotes a shutter drive unit, and the shutter drive unit 128 drives and controls the aperture-shutter actuator 112 to control the aperture of the iris shutter 102. Reference numeral 129 denotes a zoom drive unit, and the zoom drive unit 129 drives the zoom actuator 111 according to zoom operation of a photographer.

Reference numeral 131 denotes a display device such as an LCD, and the display device 131 displays information about a photographing mode of a camera, a pre-photographing preview image and a post-photographing confirmation image, an in-focus state displaying image at the time of focus detection. Reference numeral 132 denotes an operation switch group, and the operation switch group 132 includes a power source switch, a release (photographing trigger) switch, a zoom operation switch, a photographing mode select switch. Reference numeral 133 denotes a detachable flash memory, and the flash memory 133 records image data such as a taken image.

Figure 2:
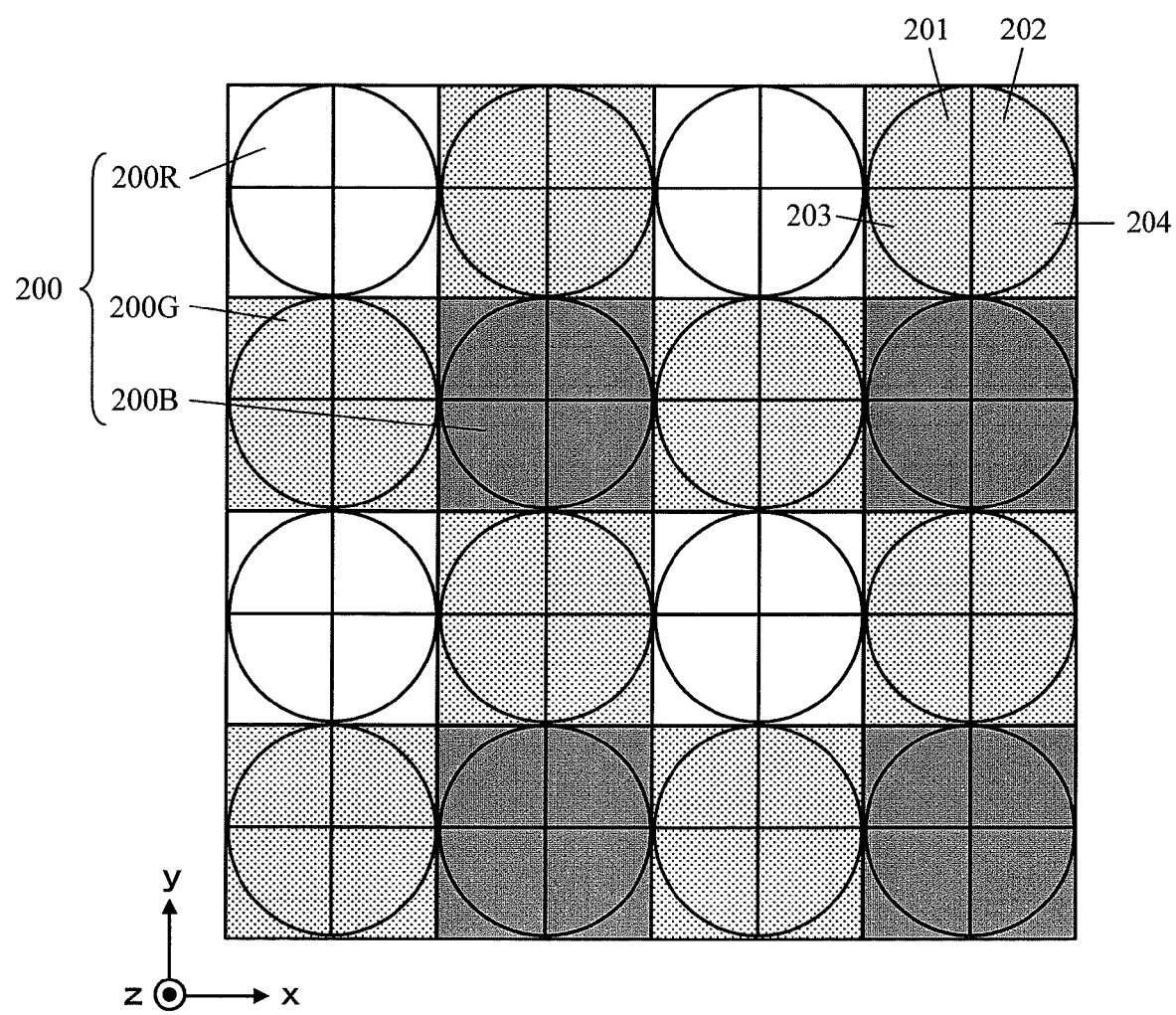
FIG. 2 is a view schematically showing a pixel array of an image pickup element according to the embodiment of the present invention.

FIG. 2 shows a conceptual diagram of a pixel array and a sub-pixel array of an image pickup element according to the present embodiment.

FIG. 2 schematically shows the pixel array and sub-pixel array of a two-dimensional CMOS sensor (image pickup element) of the present embodiment within a range of 4 rows×4 columns for the pixel array and within a range of 8 rows×8 columns for the sub-pixel array. In an actual image pickup element, a large number of the pixel arrays of 4 rows×4 columns shown in FIG. 2 (the sub-pixel arrays of 8 rows×8 columns) are arranged on the light-receiving surface to allow image acquisition. More specifically, in the present embodiment, it is assumed that an image pickup element is arranged such that a pixel period $\Delta X$ is 10 μm, and the number of effective pixels $N_{LF}$ are 3600 rows×24000 columns=about 8.6 million pixels (sub-pixel period $\Delta x$ is 5 μm, and the number of effective sub-pixels N is 7200 rows×4800 columns=about 34.6 million pixels).

In the present embodiment, in a pixel group 200 of 2 rows×2 columns shown in FIG. 2, a pixel 200R having a R (red) spectrum sensitivity is disposed at the upper left position, a pixel 200G having a G (green) spectrum sensitivity is disposed at the upper right position and the lower left position, and a pixel 200B having a B (blue) spectrum sensitivity is disposed at the lower right position. In each pixel, sub-pixels 201 to 204 of $N_\theta \times N_\theta$ (2 rows×2 columns) are two-dimensionally arranged.

Figure 3A:
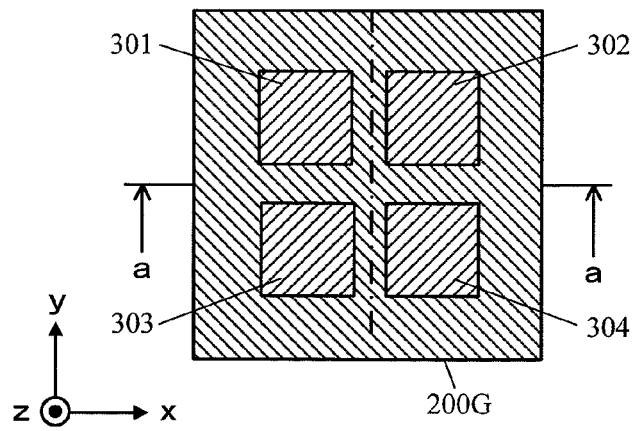
FIGS. 3A and 3B are a schematic plan view and a schematic cross-sectional view of a pixel formed in the image pickup element according to the embodiment of the present invention.
Figure 3B:
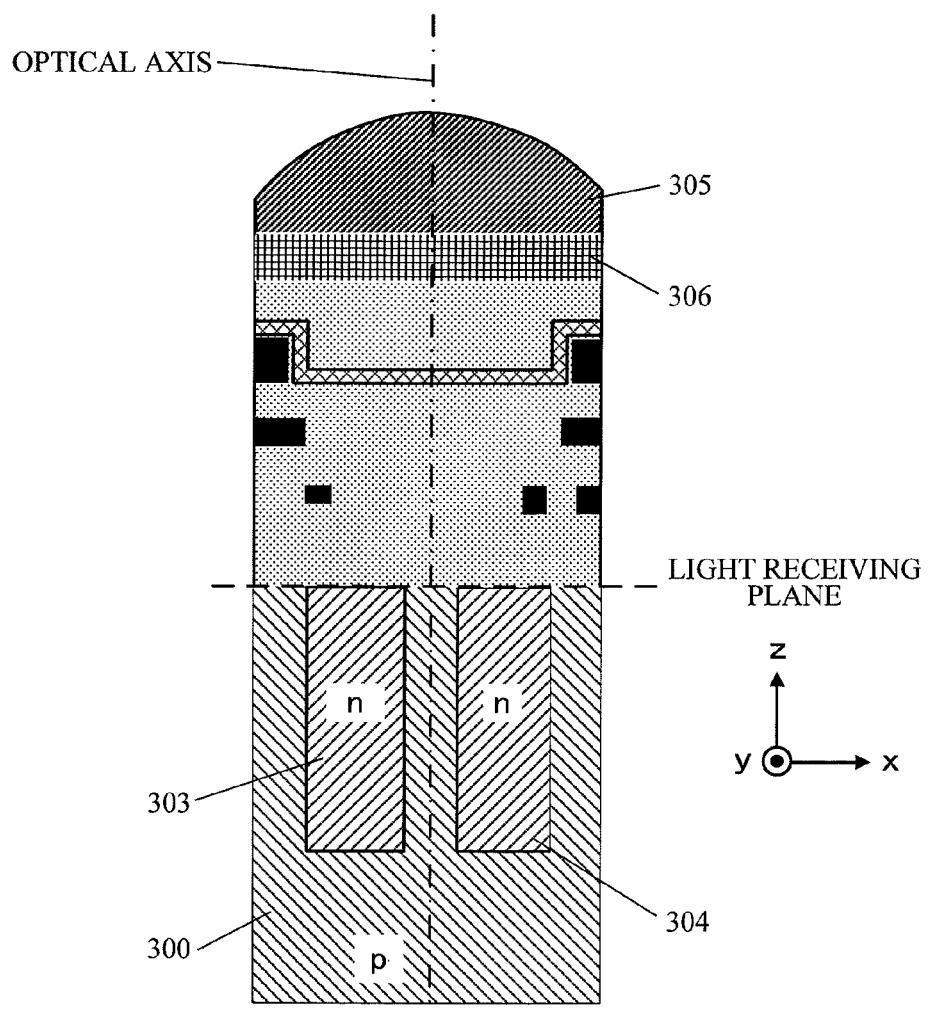

Regarding one pixel 200G of the image pickup element shown in FIG. 2, a plan view thereof viewed from a light-receiving surface side (+z side) of the image pickup element is shown in FIG. 3A, and a cross-sectional view of an a-a cross-sectional surface of FIG. 3A as viewed from a −y side is shown in FIG. 3B.

As shown in FIGS. 3A and 3B, in the pixel 200G of the present embodiment, a microlens 305 for concentrating incident light is provided on the light-receiving side of each pixel, and photoelectric conversion units 301 to 304 divided into $N_\theta$ (two) in both x and y directions are provided. The photoelectric conversion units 301 to 304 correspond to the sub-pixels 201 to 204, respectively.

The photoelectric conversion units 301 to 304 may be pin-structure photodiodes with an intrinsic layer provided between a p-type layer and an n-type layer or may be pn-junction photodiodes while omitting the intrinsic layer as necessary.

In each pixel, a color filter 306 is provided between the microlens 305 and the photoelectric conversion units 301 to 304. As necessary, the spectrum transmissivity of the color filter may be changed for each sub-pixel, or the color filter may be omitted.

Light entering the pixel 200G shown in FIGS. 3A and 3B is concentrated by the microlens 305, color-separated by the color filter 306, and then received by the photoelectric conversion units 301 to 304.

In the photoelectric conversion unit having the pin structure, an electron and a hole are generated through pair production according to a light-receiving amount and separated by a depletion layer, and thereafter, while electrons having a negative charge are accumulated in an n-type layer (not shown), holes are discharged outside the image pickup element through a p-type layer connected to a constant voltage source (not shown).

Figure 4:
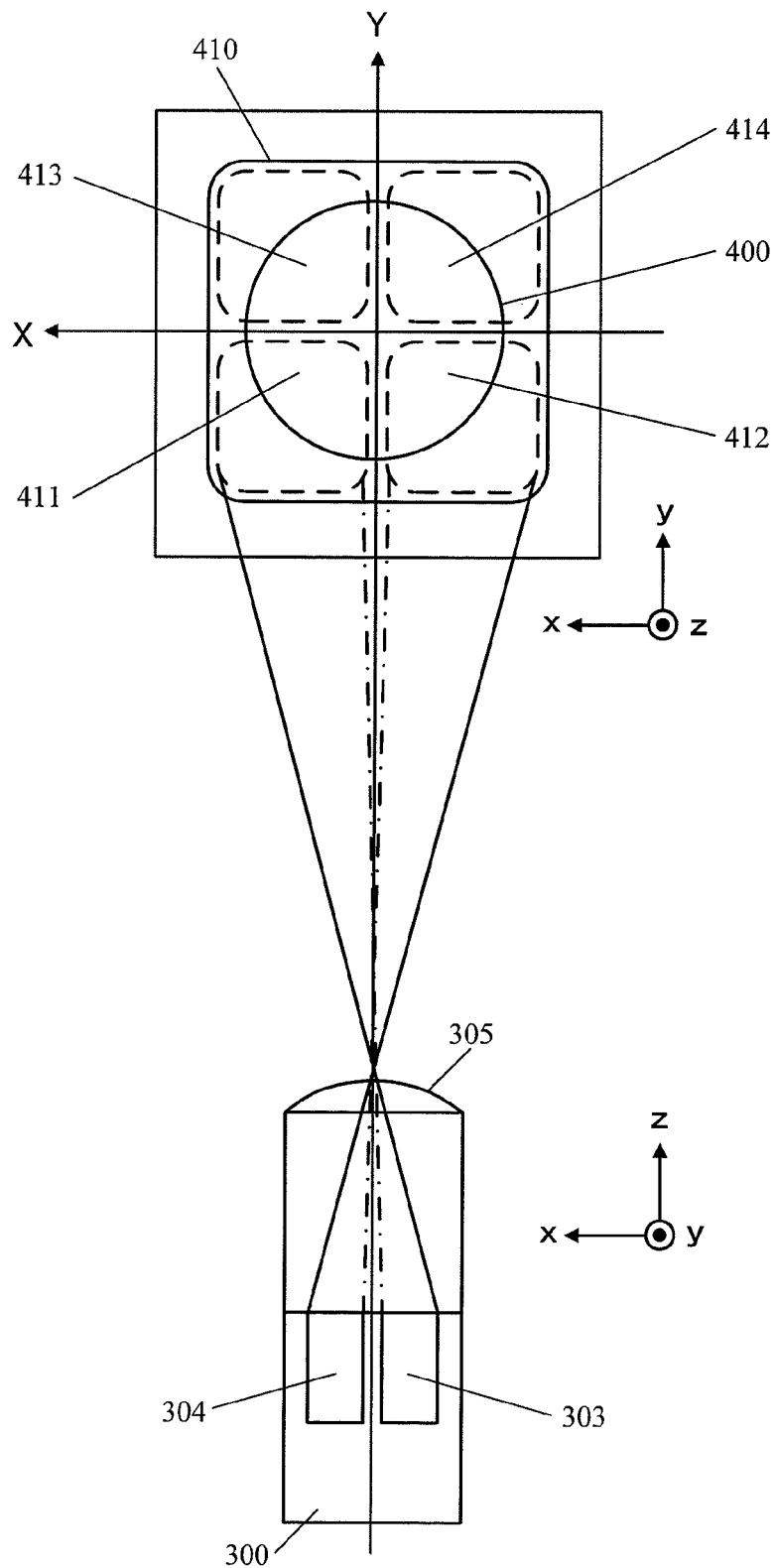
FIG. 4 is a view schematically showing a relationship between the pixel of the image pickup element and pupil division according to the embodiment of the present invention.
Figure 5:
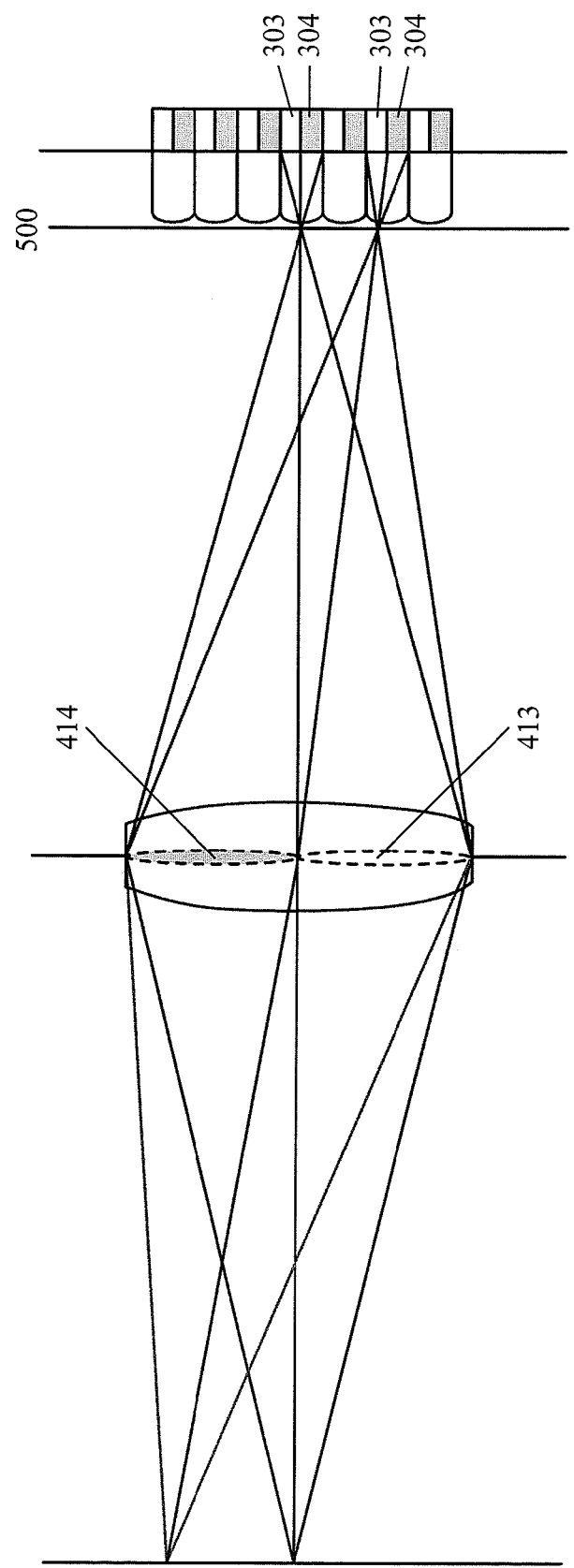
FIG. 5 is a view schematically showing the relationship between the pixel of the image pickup element and the pupil division according to the embodiment of the present invention.

Next, a pupil division unit in the present embodiment will be described. A correspondence relationship between the photoelectric conversion units 301 to 304 (the sub-pixels 201 to 204) and the pupil division is schematically shown in FIGS. 4 and 5. FIG. 4 shows a cross-sectional view of an a-a cross-sectional surface of the image pixel 200G shown in FIG. 3A as viewed from a +y side and an exit pupil plane of the focusing optical system. In FIG. 4, in order to correspond to a coordinate axis of the exit pupil plane, the x and y axes in the cross-sectional view are reversed with respect to FIGS. 3A and 3B (FIG. 3B is a cross-sectional view as viewed from the −y side). In FIG. 4, the components the same as those in FIG. 3 are assigned the same reference numerals, and in FIG. 5, the components the same as those in FIGS. 3A, 3B and 4 are assigned the same reference numerals.

The image pickup element is disposed in neighborhood of the focus plane of the photographing lens (focusing optical system), and light from the object passes through an exit pupil 400 of the focusing optical system and enters each pixel. A plane on which the image pickup element is disposed arranged is an image pickup plane 500. By the microlens, partial pupil areas 411 to 414 are substantially conjugate with the light-receiving surfaces of the photoelectric conversion units 301 to 304 (the sub-pixels 201 to 204) divided into $N_\theta \times N_\theta$ (2×2). Accordingly, the light passing through each partial pupil area is received by each of the photoelectric conversion units (sub-pixels) having a corresponding conjugate relation. The exit pupil 400 of the focusing optical system is divided into $N_p$ different partial pupil areas when the pupil division number is $N_p = N_\theta \times N_\theta$. When the aperture value of the focusing optical system is represented by F, the effective aperture value in the partial pupil area is substantially $N_\theta F$. A pupil area 410 is such a pupil area that the entire pixel 200G when all the photoelectric conversion units 301 to 304 (the sub-pixels 201 to 204) divided into $N_\theta \times N_\theta$ (2×2) are put together can receive light passing through that pupil area.

Further, a correspondence relationship between the image pickup element of the present embodiment and the pupil division will be described with reference to FIG. 5. The photoelectric conversion units 301 to 304 (the sub-pixels 201 to 204) in which each pixel of the image pickup element is divided into $N_\theta \times N_\theta$ (2×2) receive the respective lights passing through the different partial pupil areas 411 to 414.

Next, parallactic image generation in the first embodiment will be described. In each pixel, a signal of a specified sub-pixel is selected from among the sub-pixels 201 to 204 (the photoelectric conversion units 301 to 304), whereby the parallactic image corresponding to a specified partial pupil area among the partial pupil areas 411 to 414 of the focusing optical system can be obtained. For example, in each pixel, when a signal of the sub-pixel 203 (the photoelectric conversion unit 303) is selected, the parallactic image having a resolution corresponding to the number of effective pixels corresponding to the partial pupil area 413 of the focusing optical system can be obtained. The same holds for other sub-pixels. Thus, in the present embodiment, a plurality of (pupil division number $N_p$) parallactic images for each different partial pupil area are obtained by the image pickup element in which a plurality of pixels constituted of arrangement of a plurality of sub-pixels receiving light passing through different partial pupil areas of the focusing optical system are arranged.

Figure 6:
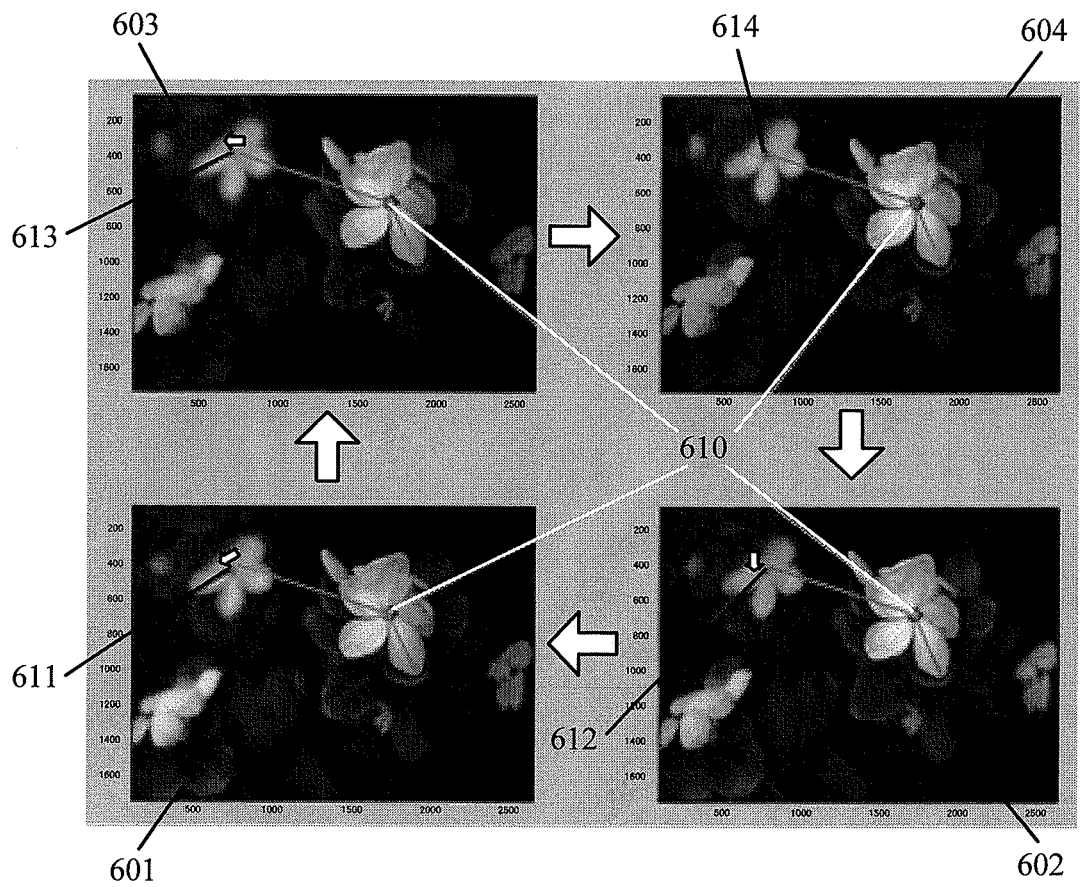
FIG. 6 is a view showing examples of parallactic images with different viewpoints according to the embodiment of the present invention.

Different partial pupil areas through which light passes have different viewpoints. Accordingly, a plurality of (pupil division number $N_p$) parallactic images with different viewpoints are obtained by the image pickup element of the present embodiment. An example of the parallactic image in the present embodiment is shown in FIG. 6. Parallactic images 601 to 604 are a plurality of parallactic images with different viewpoints corresponding respectively to the partial pupil areas 411 to 414.

In each pixel, when all the signals of the sub-pixels 201 to 204 are added, a taken image having a resolution corresponding to the number of effective pixels can be generated.

Next, a relationship between an amount of image shift between the parallactic images and a defocus amount according to the present invention will be described.

Figure 7:
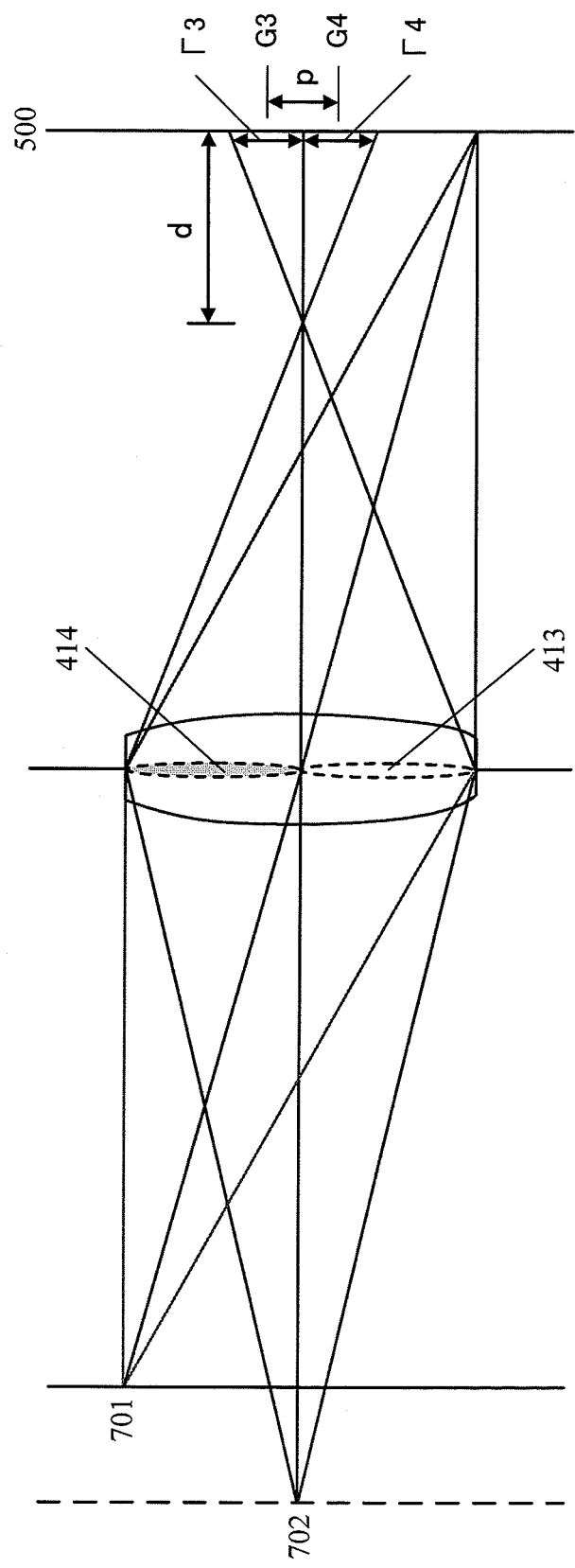
FIG. 7 is a view schematically showing an amount of image shift between the parallactic images and a defocus amount according to the embodiment of the present invention.

FIG. 7 schematically shows a relationship diagram between the amount of image shift between the parallactic images and the defocus amount. The image pickup element (not shown) of the present embodiment is disposed on the image pickup plane 500, and as in FIG. 5, the exit pupil of the focusing optical system is divided into $N_p$ (four) areas including the partial pupil areas 411 to 414.

In a defocus amount d, a distance from an image pickup position of an object to an image pickup plane is denoted by a magnitude |d|. d is defined so that a front focus state in which a focal point of the object is on the object side of the image pickup plane is negative (d<0), and a rear focus state in which a focal point of the object is on the opposite side of the image pickup plane is positive (d>0). An in-focus state in which the image pickup position of the object is on the image pickup plane is d=0. In FIG. 7, an object 701 shows an example of the in-focus state (d=0), and an object 702 shows an example of the front focus state (d<0). The front focus state (d<0) and the rear focus state (d>0) are used together to represent a defocus state (|d|>0).

In the front focus state (d<0), light passed through the partial pupil area 413 (414) among light from an object 702 is temporarily converged, then spreads with a width Γ3 (Γ4) around a position G3 (G4) of the center of gravity of the light, and forms a blurred image on the image pickup plane 500. The blurred image is light-received by the sub-pixel 203 (204) constituting each pixel on the image pickup element disposed on the image pickup plane 500, so that a parallactic image is generated from the output of the sub-pixels. Accordingly, the object 702 spreading across the width Γ3 (Γ4) around the position G3 (G4) of the center of gravity is recorded as a blurred object image for the parallactic image generated from the signal of the sub-pixel 203 (204). The blur width Γ3 (Γ4) of an object image increases substantially in proportion to increase of the magnitude |d| of the defocus amount d. Similarly, a magnitude |p| of an image shift amount p (=G3−G4) of the object image between the parallactic images increases substantially in proportion to increase of the magnitude |d| of the defocus amount d. In the rear focus state (d>0), although the image shift direction of the object image between the parallactic images is opposite to that in the front focus state, the magnitude |p| similarly increases. In the in-focus state (d=0), the positions of the centers of gravity of the object images of parallactic images coincide (p=0), the image shift does not occur.

Accordingly, in a plurality of parallactic images in the present invention, the magnitude of the amount of image shift between the parallactic images increases with the increase of the magnitude of the defocus amount of the parallactic image.

In the example shown in FIG. 6, in an object image 610 in the in-focus state (d=0), the image shift does not occur, and the object image 610 is taken at the same position in the parallactic images 601 to 604. Meanwhile, in object images 611 to 614 in the defocus state (|d|>0) which is an unfocused state, the image shift occurs, and the object images 611 to 614 are taken at different positions in the parallactic images 601 to 604.

Figure 8:
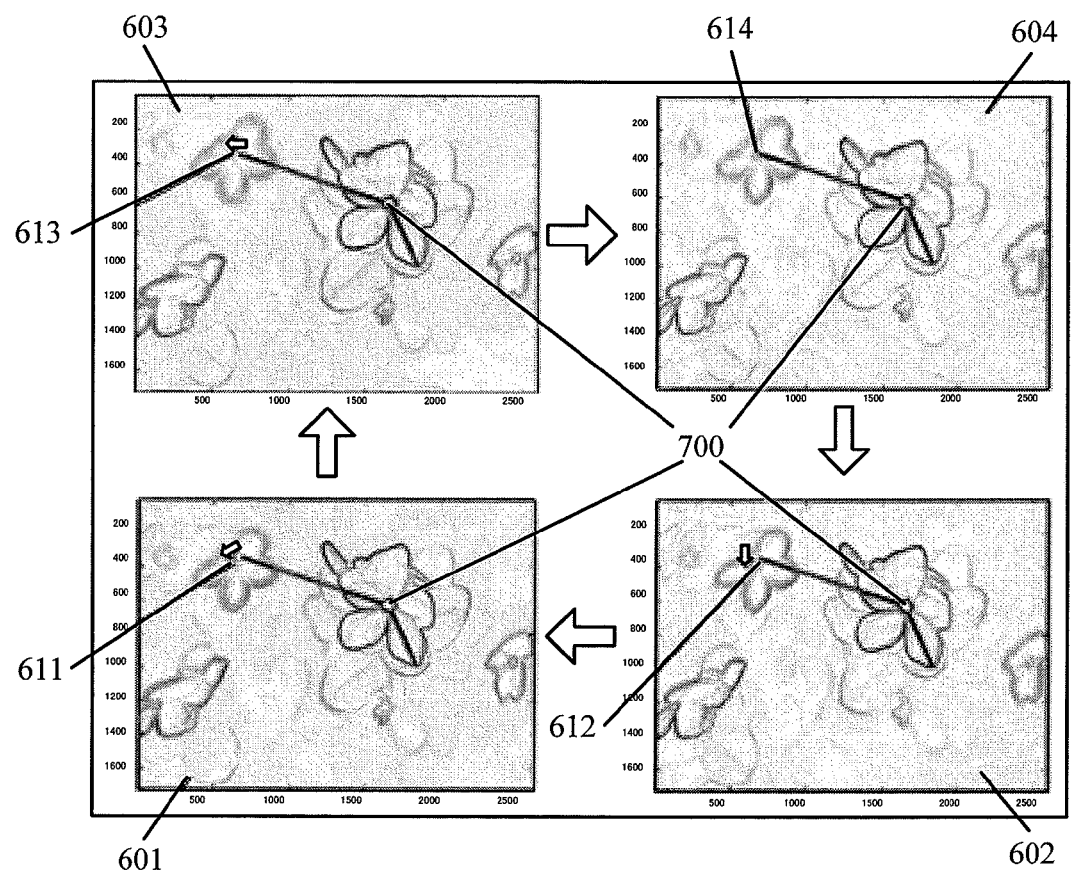
FIG. 8 is a view schematically showing an image shift between the parallactic images at different viewpoints of FIG. 6.

In FIG. 8, in order to facilitate understanding of the amount of image shift, the parallactic images 601 to 604 shown in FIG. 6 are subjected to edge extraction processing. With reference to FIG. 8, it can be shown that based on the object image 614 of the parallactic image 604, the object image 612 of the parallactic image 602 shifts in the lower direction, the object image 611 of the parallactic image 601 shifts in the lower left direction, and the object image 613 of the parallactic image 603 shifts in the left direction. Now assuming that starting from the parallactic image 604, the parallactic images will be continuously changed in an order from the parallactic image 604, the parallactic image 602, the parallactic image 601, the parallactic image 603 to the parallactic image 604, then, the image shift will appear to change while the change-directions are rotating in an order from in the lower direction, left direction, upper direction, to right direction. In order to facilitate confirmation of a change of the viewpoint between the parallactic images and realize more stereoscopic display, it is preferable that the image shift between the parallactic images appears to be not collinear. In this example, in consideration of this point, a moving output image for a three-dimensional display is generated from the parallactic images obtained by the image pickup element.

Figure 9:
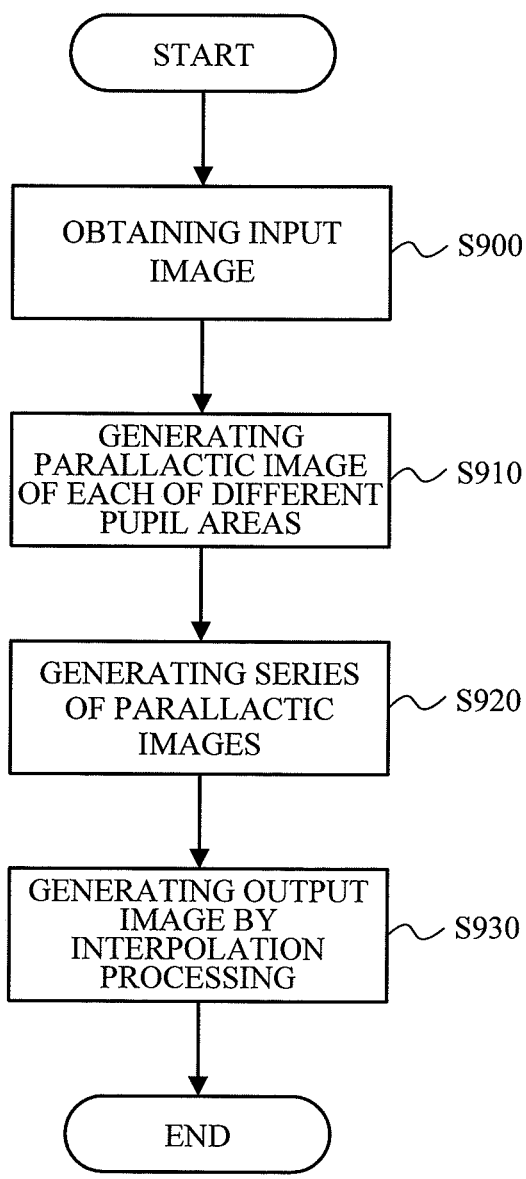
FIG. 9 is a flow chart of processing of generating a stereoscopic image according to the embodiment of the present invention.

Subsequently, after the generation of the parallactic images in the present embodiment from an input image, the output moving image is generated from the parallactic images. The image processing method will be described using a flow chart shown in FIG. 9. A parallactic image generation processing, a processing of generating a series of parallactic images, and interpolation processing according to the flow chart of this embodiment shown in FIG. 9 are executed by a CPU 121 based on predetermined programs stored in a ROM. Namely, the CPU 121 functions as a parallactic image generation unit, a parallactic image series generation unit, and an interpolation unit.

In step S900, an input image is obtained by an image pickup element in which a plurality of pixels provided with a plurality of sub-pixels (the sub-pixels 201 to 204) receiving light passing through different partial pupil areas of the focusing optical system are arranged. Alternatively, an input image previously taken by the image pickup element having the above constitution and stored in a recording medium may be used. Namely, the image processing in this embodiment can be realized in not only the image pickup apparatus as shown in FIG. 1 but also an information processing apparatus such as a PC. In this case, a CPU controlling the overall operation of the information processing apparatus corresponds to the CPU 121 of this example. The image processing in this embodiment can also be realized in a display device having a CPU functioning as the parallactic image generation unit, the parallactic image series generation unit, and the interpolation unit and an image processing engine.

The number of the pixels in the x direction of the image pickup element is denoted with $N_x$, the number of the pixels in the y direction is denoted with $N_y$, the position in the x direction is represented by i (=1 to $N_x$), and the position in the y direction is denoted with j (=1 to $N_y$). The number of effective pixels $N_{LF}=N_x \times N_y$. The pixel at the position (i, j) of the image pickup element is denoted with P(i, j), an integer a=1 to $N_\theta$, and the a-th sub-pixel is denoted with $P_a(i, j)$. An image pickup signal (photoelectric conversion signal) obtained from the sub-pixel $P_a(i, j)$ is denoted with $L_a(i, j)$.

Tn Tn the input image is, an aggregate L of all the signal $L_a(i,j)$, i.e., L={$L_a(i,j)$|i=1 to $N_x$, j=1 to $N_y$, a=1 to $N_\theta$}.

In step S910, a signal of a specified sub-pixel is selected from among the sub-pixels 201 to 204 of each pixel of the input image. Consequently, the parallactic image corresponding to a specified partial pupil area of the partial pupil areas 411 to 414 of the focusing optical system is generated. Namely, the parallactic images having a resolution corresponding to the number of effective pixels are generated for each of different partial pupil areas. As described above, in those parallactic images, the magnitude of the amount of image shift between the parallactic images increases with the increase in the magnitude of the defocus amount of the parallactic image.

The signal of the parallactic image generated from the signal of the sub-pixel $P_a$ is represented by an aggregate $L_a$={$L_a(i, j)$|i=1 to $N_x$, j=1 to $N_y$}. The parallactic images generated from signals from other sub-pixels are {$L_a$|a=1 to $N_\theta$}.

In the present embodiment, the sub-pixel 201 is denoted with a=1, the sub-pixel 202 is denoted with a=2, the sub-pixel 203 is denoted with a=3, and the sub-pixel 204 is denoted with a=4. In this case, the parallactic images to be generated include four parallactic images of a parallactic image $L_1$ corresponding to the partial pupil area 411, a parallactic image $L_2$ corresponding to the partial pupil area 412, a parallactic image $L_3$ corresponding to the partial pupil area 413, and a parallactic image $L_4$ corresponding to the partial pupil area 414.

As described above, in the present embodiment, by virtue of the image pickup element in which the pixels having the sub-pixels receiving light passing through the different partial pupil areas of the focusing optical system are arranged, the parallactic images corresponding to the different partial pupil areas are generated from the obtained input image.

In step S920, the first to n-th parallactic images mage are selected sequentially from the parallactic images {$L_a$|a=1 to $N_\theta$} generated in step S910, while permitting a repeated same selection, and a series of the parallactic images in the selected order {$I_k$|k=1 to n} are generated, where k and n are positive integers.

In the present embodiment, a plurality of number of times of selection is assumed to be n=5, and the series of parallactic images in which the first parallactic image $I_1$ is $L_4$, the second parallactic image $I_2$ is $L_2$, the third parallactic image $I_3$ is $L_1$, the fourth parallactic image $I_4$ is $L_3$, and the fifth parallactic image $I_5$ is $L_4$ is generated.

In step S930, assuming that k=1 to n−1, the interpolation processing between the k-th parallactic image $I_k$ and the k+1-th parallactic image $I_{k+1}$ included in the series of parallactic images generated in step S920 is repeated to generate an output image of a moving image.

In the present embodiment, the interpolation processing between the k-th parallactic image $I_k$ and the k+1-th parallactic image $I_{k+1}$ included in the series of parallactic images and adjacent to each other is changed in a stepwise manner with an integer m=0 to M−1 and weight $t_m$=m/M, to generate the interpolation image $I_{k, k+1, m}$=$t_m I_k$+(1−$t_m$)$I_{k+1}$. The interpolation image {$I_{k, k+1, m}$|k=1 to n−1, m=0 to M−1} generated in each pair of adjacent parallactic images are arranged in order, between the adjacent parallactic images to generate the output image of the moving image. The interpolation processing is not limited to that in the present embodiment, and any interpolation processing may be used.

The output image generated in the present invention is a moving image in which an object in the in-focus state remains at rest without moving and an object blurred in the defocus state continuously moves by the amount of image shift corresponding to the magnitude of the defocus amount. In the example of FIG. 6, the object image 610 in the in-focus state remains at rest, the object images 614, 612, 611, and 613 blurred in the defocus state continuously move in a clockwise direction with interpolated images being inserted therebetween. According to this constitution, the parallactic image can be displayed three-dimensionally using a standard display device for a two-dimensional image without an exclusive three-dimensional display device. Moreover, a clear object in the in-focus state does not move, and an object blurred in the defocus state moves; therefore, a natural moving image with less burden on eyes can be generated.

In the present embodiment, the first parallactic image $I_1=L_4$ and the last (the n-th=fifth) parallactic image $I_5=L_4$ of the series of parallactic images are the same image. When the moving output image is repeatedly reproduced, it is preferable for displaying continuously without any separation that the first parallactic image and the n-th parallactic image are the same as each other.

In the present embodiment, assuming that an integer k=1 to n−1, the partial pupil areas corresponding to the k-th parallactic image and the partial pupil areas corresponding to the k+1-th parallactic image are entirely adjacent to each other. More specifically, in FIG. 4, the partial pupil area 414 corresponding to the first parallactic image $I_1$ (=$L_4$) and the partial pupil area 412 corresponding to the second image $I_2$ (=$L_2$) are adjacent to each other. This also applies to others. In order to continuously smoothly change the output image of the moving image, it is preferable that the partial pupil areas corresponding to the k-th parallactic image and the partial pupil areas corresponding to the k+1-th parallactic image are entirely adjacent to each other.

In the processing of the flow chart of FIG. 9 dark correction, shading compensation, de-mosaicing processing, or the like may be applied to any one of an input image, a parallactic image, an interpolation image, and an output image or combinations of them according to the needs.

In the present embodiment, although the example in which the exit pupil of the focusing optical system is divided into 2×2 different partial pupil areas has been described, the present invention also can be applied to other pupil division numbers. The pupil division number in the x direction and the pupil division number in y direction may be different from each other. The pupil division direction may be different from the x and y directions.

The output image generated by the above image processing is output to the display device 131 and displayed.

The present embodiment is an example of an image pickup apparatus having an image processing unit performing the above image processing.

According to the above configuration, a plurality of parallactic images can be displayed three-dimensionally without reducing the convenience of a three-dimensional image display.

(Other Embodiments)

The present invention can be realized in a display device such as a digital television, a digital photo stand, a tablet PC, and a cellular phone, which reads an input image previously stored in a recording medium and has an image processing unit performing the above image processing.

Each unit constituting the recording apparatus of the embodiment of the present invention described above and each process of the above recording method can be realized by operating programs stored in a RAM and a ROM of a computer. A computer-readable storage medium storing this program and the above program is included in the present invention.

The present invention can adopt embodiments in the form of, for example, a system, an apparatus, a method, a program, a storage medium, or the like. More specifically, the present invention may be applied to a system constituted of a plurality of equipment or may be applied to an apparatus constituted of one equipment.

The present invention includes a case where a program of software realizing the functions of the embodiments described above (the program corresponding to the flow chart shown in FIG. 5 in the embodiments) is directly or remotely supplied to a system or an apparatus. The present invention further includes a case where the functions are attained by reading the supplied program code by the computer of the system or the apparatus and executing the program.

Accordingly, in order to realize the functional processing of the present invention by the computer, the program code itself installed in the computer realizes the present invention. Namely, the present invention includes a computer program itself for realizing the functional processing of the present invention. In this case, the program may take any form such as an object code, a program to be executed by an interpreter, or script data to be supplied to an OS as long as it has a function of a program.

As a storage medium for supplying a program, for example, there are, for example, a flexible disk, a hard disk, an optical disk, a magneto-optical disk, and so on. Moreover, there are an MO, a CD-ROM, a CD-R, a CD-RW, a magnetic tape, a nonvolatile memory card, ROM, DVD (DVD-ROM and DVD-R), and so on.

As a method of supplying a program, there is a method of connecting to the homepage on an internet by using browser of a client computer. Moreover, the program can also be supplied by downloading a computer program itself of the present invention from the homepage or a compressed file including an automatic install function to a recording medium such as a hard disk.

Further, a computer executes a read program to realize the functions of the embodiment described above. Furthermore, an OS or the like running on the computer performs a part of or the entire actual processing based on the instruction of the program, and the functions of the embodiment described above may be realized by the processing.

Furthermore, as other method, a program read from a recording medium is first written in a memory of a function extension board inserted in a computer or a function extension unit connected to the computer. Then, a CPU or the like of the function extension board or the function extension unit executes a part of or the entire actual processing based on the instruction of the program, and the functions of the embodiment described above is realized by the processing.

The present invention has been described with reference to preferred embodiments. The present invention is not limited to the above-described embodiments, but various modifications are possible within the scope described in the claims.

This application claims the benefit of Japanese Patent Application No. 2011-275953, filed on Dec. 16, 2011, which is hereby incorporated by reference herein in its entirety.

What is claimed is:

1. An image processing apparatus comprising:
an input unit which inputs an image obtained by an image pickup unit in which pixels that receive light passing through different pupil areas of a focusing optical system are arranged;

a parallactic image generation unit which generates a plurality of parallactic images having a relationship in which a magnitude of an amount of image shift between the parallactic images increases with an increase in a magnitude of a defocus amount;

a parallactic image series generation unit which, through a plurality of selections of the generated parallactic images permitting a repeated same selection, generates a series of parallactic images in which the selected parallactic images are arranged in a selection order;

an interpolation processing unit which repeatedly applies interpolation processing to each pair of adjacent parallactic images included in the series of parallactic images to generate a plurality of interpolation images and arranges the generated interpolation images between the adjacent parallactic images to output the interpolated images; and an output unit which outputs an output of the interpolation processing unit as an output image of a moving image.

2. The image processing apparatus according to claim 1, wherein, in the generated parallactic images, the respective parallactic images correspond to different pupil areas of an exit pupil of the focusing optical system, and the image shift is not collinear.

3. The image processing apparatus according to claim 1, wherein the parallactic image series generation unit selects the generated parallactic images such that the first parallactic image of the parallactic image series and the last parallactic image are the same.

4. The image processing apparatus according to claim 2, wherein the parallactic image series generation unit selects the generated parallactic images such that the pupil areas corresponding to the adjacent parallactic images are adjacent to each other.

5. The image processing apparatus according to claim 1, wherein the interpolation processing unit repeatedly applies interpolation processing to each pair of the adjacent parallactic images while changing weighting in a stepwise manner.

6. A method of controlling an image processing apparatus including an input unit inputting an image and a processing unit for the input image, comprising the steps of:

inputting, by means of the input unit, an image obtained by an image pickup unit in which pixels that receive light passing through different pupil areas of a focusing optical system are arranged;

generating, from the image input by the input unit, a plurality of parallactic images having a relationship in which a magnitude of an amount of image shift between the parallactic images increases with an increase in a magnitude of a defocus amount;

generating, through a plurality of selections of the input parallactic images permitting a repeated same selection, a series of parallactic images in which the selected parallactic images are arranged in a selection order;

repeatedly applying interpolation processing to each pair of adjacent parallactic images included in the series of parallactic images to generate a plurality of interpolation images and arranging the generated interpolation images between the adjacent parallactic images to output the interpolated images; and outputting an output in the interpolation processing step as an output image of a moving image.

7. A non-transitory computer readable storing medium storing a program comprising a code for causing a computer to execute the control method according to claim 6.

8. An image pickup apparatus comprising:
a focusing optical system;
an image pickup unit in which pixels that receive light passing through different pupil areas of a focusing optical system are arranged; and
the image processing apparatus according to claim 1.

9. The image pickup apparatus according to claim 8, wherein the pixel has a plurality of sub-pixels receiving light passing through different pupil areas of the focusing optical system, and the parallactic image generations unit generates the parallactic images from an output of the sub-pixel corresponding to each pupil area.

10. The image pickup apparatus according to claim 1, wherein the sub-pixels are two-dimensionally arranged.

11. A display device comprising:
a display unit; and
the image processing apparatus according to claim 1.

* * * * *